US009902602B2

(12) United States Patent
Van Seumeren

(10) Patent No.: US 9,902,602 B2
(45) Date of Patent: Feb. 27, 2018

(54) DEVICE, CARRYING BODY AND LIFTING VEHICLE

(75) Inventor: Henri Peter Maria Van Seumeren, Rossum (NL)

(73) Assignee: RAVAS EUROPE B.V., Zaltbommel (NL)

( * ) Notice: Subject to any disclaimer, the term of this patent is extended or adjusted under 35 U.S.C. 154(b) by 392 days.

(21) Appl. No.: 14/130,754

(22) PCT Filed: Jul. 6, 2012

(86) PCT No.: PCT/NL2012/000046
§ 371 (c)(1),
(2), (4) Date: Feb. 25, 2014

(87) PCT Pub. No.: WO2013/006038
PCT Pub. Date: Jan. 10, 2013

(65) Prior Publication Data
US 2014/0224588 A1     Aug. 14, 2014

(30) Foreign Application Priority Data
Jul. 6, 2011   (NL) ........................................ 2007060

(51) Int. Cl.
*B66F 17/00*   (2006.01)
*B66F 9/12*    (2006.01)
*G01G 19/08*   (2006.01)

(52) U.S. Cl.
CPC .............. *B66F 17/003* (2013.01); *B66F 9/12* (2013.01); *G01G 19/083* (2013.01)

(58) Field of Classification Search
CPC ........ B66F 17/003; B66F 9/12; G01G 19/083
See application file for complete search history.

(56) References Cited

U.S. PATENT DOCUMENTS

| 4,899,840 A | 2/1990 | Boubille |
| 5,417,536 A * | 5/1995 | Cech .................... G01G 19/083 177/140 |

(Continued)

FOREIGN PATENT DOCUMENTS

| CA | 2324481 A1 * | 5/2002 | ................ B66F 9/12 |
| CN | 2883305 | 3/2007 | |

(Continued)

OTHER PUBLICATIONS

English Machine Translation of DE 40 29 925.*
International Search Report, dated Oct. 9, 2012, from corresponding PCT application.

*Primary Examiner* — William E Dondero
*Assistant Examiner* — Diem M Tran
(74) *Attorney, Agent, or Firm* — Young & Thompson

(57) ABSTRACT

A device 1 includes a carrying body for carrying a load. The carrying body includes a first wall 3 which receives the load and an opposite second wall 2. Between the first wall and the second wall is a space in which a force sensor is provided. A part of the force sensor 4 is coupled to the second wall 2 and the other part of the force sensor extends beyond an edge of the second wall 2 so that the force sensor has some freedom to bend. An at least partially bendable force transmission body 5 is fixed to the first wall 3 and extends in a cavity 6 in the other part of the force sensor. Owing to the force transmission body 5 the force sensor is loaded only in a direction to which the force sensor is tuned.

20 Claims, 1 Drawing Sheet

(56) References Cited

U.S. PATENT DOCUMENTS

| | | | | |
|---|---|---|---|---|
| 5,922,998 A | * | 7/1999 | Zefira | G01G 19/083 |
| | | | | 177/136 |
| 2003/0234122 A1 | | 12/2003 | Kroll et al. | |
| 2004/0018341 A1 | * | 1/2004 | Richardson | B62D 25/04 |
| | | | | 428/138 |
| 2008/0178690 A1 | * | 7/2008 | Simons | G01G 19/083 |
| | | | | 73/862.541 |

FOREIGN PATENT DOCUMENTS

| | | |
|---|---|---|
| DE | 40 29 925 A1 | 3/1992 |
| DE | 196 32 161 A1 | 2/1998 |
| FR | 2 727 394 A1 | 5/1996 |
| NL | 8 901 884 A | 2/1991 |
| WO | 9425833 A1 | 11/1994 |

* cited by examiner

DEVICE, CARRYING BODY AND LIFTING VEHICLE

The present invention relates to a device comprising a carrying body for carrying a load, wherein the carrying body comprises a space inside which at least one force sensor is provided between a first wall which receives the load and an opposite second wall, wherein the force sensor extends partially beyond an edge of the second wall, and comprising a force transmission for transmitting to the force sensor a force resulting from a load on the first wall.

A known example of such a device is a weighing fork of a lifting vehicle, such as a fork-lift truck or a pallet truck, wherein the weighing fork usually comprises as carrying body two lift forks in which four force sensors, normally referred to as load cells, are accommodated. The load cells comprise a pressure or strain-sensitive sensor, for instance in the form of a so-called secondary transducer such as a resistance strain gauge, which is able to determine a mechanical deformation of the load cell and generate this as electronic signal. In the known device the load cells lie in a space between a top wall of the lift fork on which the load is received and a bottom wall of the lift fork on which the load cells are placed. Because a part of the load cells extends beyond an edge of the bottom wall, the load cells are able to bend under pressure. A force resulting from a pressure load exerted on the lift forks, for instance by a cargo placed on the weighing fork, is transmitted directly via the top wall to the load cells and thus results in a mechanical deformation of the load cells. The measure of deformation is determined by the sensor and sent as electronic signal to a processing device intended for this purpose. The force exerted on the lift fork can be calculated from the electronic signal and, from a result of the four force sensors together, the overall weight of the cargo on the lift forks can finally be derived by the processing device.

Although it is possible with the known device to measure forces for the purpose of deriving for instance a weight of a cargo received on the device, the known device does however have the drawback that the measurement values are not optimally accurate under all conditions. An accurate measurement result will only be obtained with the force sensors in case of a load in the direction to which the force sensor is tuned, such as in the case of the known lifting device in a purely vertical direction. A load moment of a cargo on the carrying body will however result in a mechanical play of forces in the carrying body, whereby determined parts in the carrying body will stretch or, on the contrary, be compressed to a degree which depends on a combination of the weight and placing of the cargo. A force exerted on the force sensors as a result of a load thus comprises in practice several components such as moment and torque which are the result of an eccentric loading of the carrying body in which the force sensor is incorporated.

The present invention thus has for its object, among others, to provide a device which obviates the stated drawback.

In order to achieve the stated object a device of the type stated in the preamble has the feature according to the invention that the force transmission comprises an at least partially bendable force transmission body which extends from a side of the force sensor directed toward the first wall, through a cavity in the force sensor and to an opposite side of the force sensor, and is attached at least close to the opposite side to the force sensor, wherein an accommodation of the force transmission body inside the cavity allows a bending of the force transmission body inside the cavity. A force exerted on the first wall, for instance a pressure force resulting from a load being placed thereon, will be transmitted via the force transmission body to the opposite side of the force sensor to which the force transmission body is attached. By making use here of an at least partly bendable force transmission body accommodated inside the cavity for the purpose of allowing a bending of the force transmission body, moments of forces exerted on the force transmission body will, unlike a purely vertical moment of force, result in a corresponding bending of the force transmission body.

The force transmission body will thus load the force sensor almost solely in a purely vertical direction, even in the case of an eccentric loading of the carrying body. An accuracy of a measurement result of the force sensor hereby becomes practically independent of a placing of a load on the carrying body. Because the force transmission body moreover extends here through the cavity of the force sensor and is thus largely incorporated herein, an overall size of the force sensor with force transmission body does not increase, or hardly so. The device can thus take as compact a form as the known devices, which is of great importance for many applications, such as for instance in mobile industrial weighing devices. Because the force transmission body is accommodated in protected manner incorporated in the cavity, the device is moreover sufficiently robust and durable to meet the quality standards applicable in the different fields of application. This makes the device suitable for application in the heaviest working environments.

A preferred embodiment of the device according to the present invention has the feature that the force sensor comprises a load cell provided with a pressure or strain-sensitive sensor. The pressure or strain-sensitive sensor, for instance in the form of a so-called secondary transducer such as a strain gauge, is able and adapted to determine a mechanical deformation of the load cell resulting from a load moment of a cargo received on the carrying body as a consequence of lifting and/or displacing of the cargo, and to generate this as electronic signal. The load moment can then be derived from the electronic signal with a processing device suitable for this purpose.

In a further preferred embodiment the device according to present invention is characterized in that the force transmission body inside the cavity of the force sensor comprises a bendable part with a periphery smaller than the cross-section of the cavity. It is thus precisely around the bendable part that the force transmission body has sufficient freedom of movement to convert possible load moments in a direction other than the optimal direction to a bending of the force transmission body, so that the force sensor is loaded solely in the direction to which the force sensor is tuned.

A particular embodiment of the device according to the present invention has the feature that the force transmission body comprises an external screw thread for a screw connection to a complementary internal screw thread inside the cavity of the force sensor. A reliable coupling between the force sensor and the force transmission body can thus be easily effected, wherein the forces acting on the force transmission body are generated to the force sensor.

In a further preferred embodiment the device according to the present invention is characterized in that the force transmission body comprises a laterally extending edge between an outer surface of the force sensor and the first wall. Direct contact between the force sensor and the first wall is avoided by interposing the edge. A mechanical deformation of the force sensor is hereby solely the result of a force effect by the force transmission body, so that the measurement results are extremely reliable.

In a further preferred embodiment the device according to the present invention is characterized in that the force transmission body is fixed with a first outer end directly to the first wall. The fixation of the force transmission body to the first wall prevents the force transmission body being undesirably detached from the first wall and, as a result, exerting an incorrect load on the force sensor.

In a further preferred embodiment the device according to the present invention is characterized in that the force transmission body extends wholly through the force sensor from the first wall and is connected at least close to the second wall to the force sensor. The force transmission body can thus be reliably coupled to the force sensor in simple manner. In a further preferred embodiment according to the present invention the device is thus characterized in that the force transmission body is coupled to the force sensor close to the second wall using an attaching means. In a particular embodiment hereof the device according to the present invention is characterized in that the attaching means comprises a fastening nut. Application of a separate attaching means, and in particular a fastening nut, makes it possible to embody the force transmission body itself in relatively simple manner as an elongate pin which can be carried through the cavity of the force sensor. This therefore saves on production costs of the force transmission body.

The present invention also relates to a carrying body for application in a device according to the invention.

The device according to the present invention is widely applicable in all manner of measuring systems in which forces resulting from transported, carried or lifted loads are measured. The device is particularly suitable here as lifting device of a lifting vehicle for the purpose of measuring and determining the forces of a cargo transported on the lifting vehicle. The present invention thus relates particularly to a lifting vehicle comprising a device according to the invention.

For accurate determination of a weight of a cargo the lifting vehicle according to the present invention is characterized in a preferred embodiment in that the device comprises at least one lift fork in which a force sensor with force transmission body according to the invention is provided on both outer ends.

The invention will now be further elucidated on the basis of an exemplary embodiment and an accompanying drawing. In the drawing.

The figures are otherwise purely schematic and not drawn to scale. For the sake of clarity some dimensions in particular may be exaggerated to a greater or lesser extent. Corresponding parts are designated as far as possible in the figures with the same reference numeral.

Figure 1:
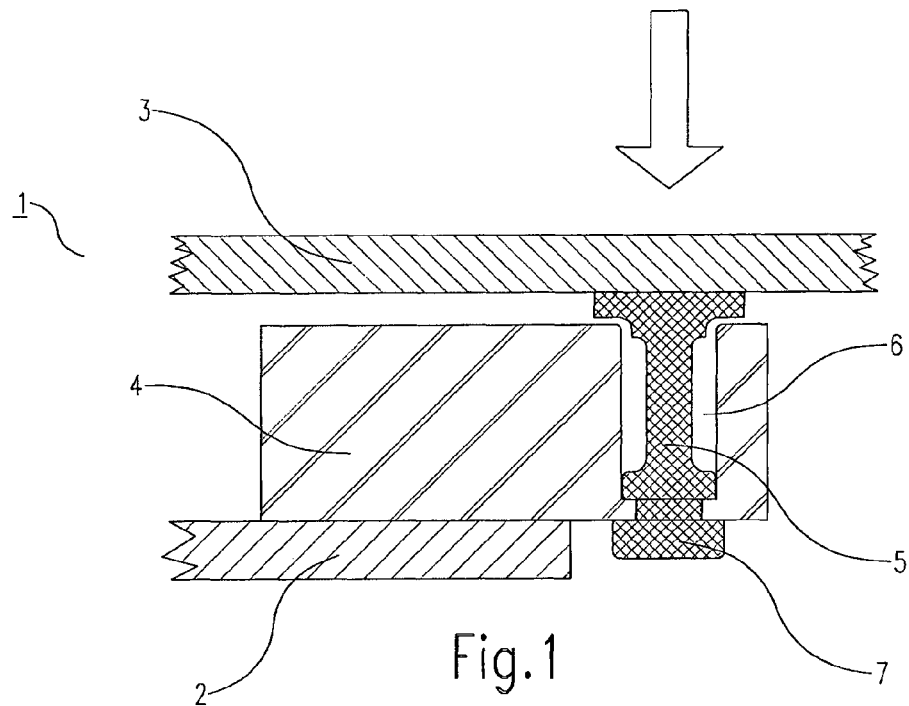
FIG. 1 shows a detail view of a force sensor and force transmission body of a device according to the invention.
Figure 2:
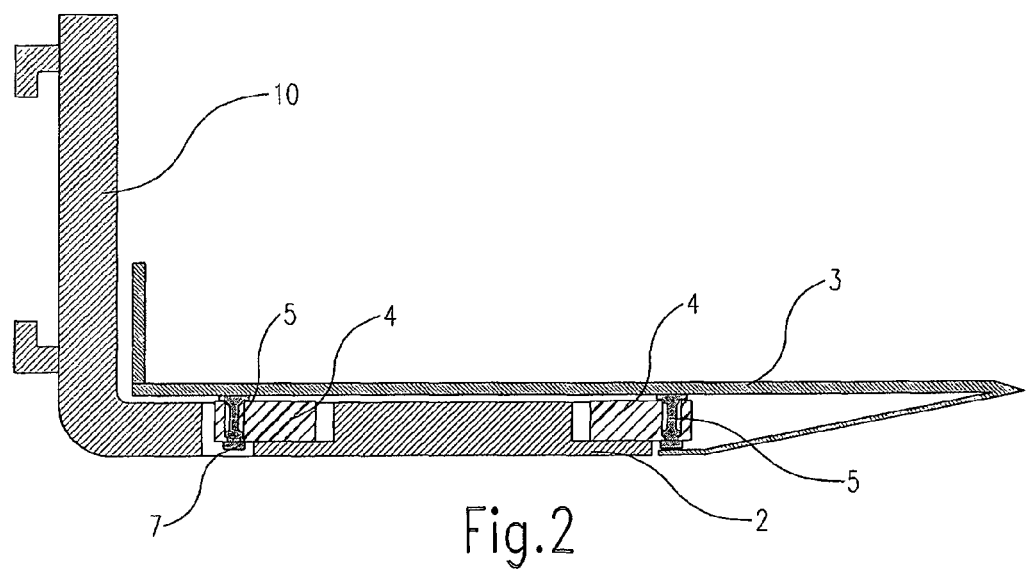
FIG. 2 shows a side view of a longitudinal section of a device according to the invention.

As shown in FIG. 1 in a detail view and in FIG. 2 in a side view of a longitudinal section, device 1 comprises a carrying body with a first wall 3 for receiving a cargo, and a second wall 2. The first and second walls leave a space clear in which a force sensor 4 is provided. In this exemplary embodiment force sensor 4 is a load cell provided with a strain gauge able to determine a deformation of the load cell and generate this as signal. A part of load cell 4 is attached to second wall 2. The other part of load cell 4 however extends beyond an edge of second wall 2 and is thus free to bend in the case of a vertical pressure from above, for instance resulting from a cargo being placed on first wall 3. Load cell 4 lies clear of first wall 3 with interposing of a force transmission body 5. For this purpose force transmission body 5 comprises on an outer end a laterally protruding edge between load cell 4 and first wall 3. Force transmission body 5 extends through a cavity in the other part of the load cell and is coupled on an opposite side of the load cell close to second wall 2 to load cell 4 by means of an attaching means 7. A part of force transmission body 5 inside the cavity has a thin periphery and takes a flexible form such that force transmission body 5 is able and adapted to bend when a moment of force acts thereon which is not purely vertical. Force transmission body 5 thus forms a force transmission which loads the load cell only in a direction to which the load cell is adapted, in this exemplary embodiment in a vertical direction. This results in a very reliable and accurate measurement result of the sensor applied in the load cell, wherein correction is for the most part made for an eccentric placing of a cargo on the carrying body. As shown in FIG. 2, device 1 is in this exemplary embodiment a lift fork which can for instance be applied in a lifting vehicle such as a fork-lift truck or a (manual) pallet truck. The lift fork comprises two lift forks which form the carrying body on which a cargo can be received. Two force sensors are provided in each of the lift forks 10 close to the outer ends of a lying part of the lift fork. A force effect of a cargo placed on the lift fork can be derived very accurately from a measurement value of the four force sensors together. A weight of the cargo can for instance be calculated, or it is possible to check whether a load moment of the cargo on the device exceeds a determined threshold so that a warning to this effect, for instance an alarm signal, can be generated in good time.

Although the invention has been further elucidated with reference to only a few exemplary embodiments, it will be apparent that the invention is by no means limited thereto. On the contrary, many other variations and embodiments are possible within the scope of the invention for the person with ordinary skill in the art.

The invention claimed is:

1. A device comprising:
   a carrying body for carrying a load, the carrying body comprising a first wall which receives the load, a second wall opposite to the first wall, and a space located between the first wall and the second wall;
   a force sensor having an upper side, an opposite lower side, and a cavity, said cavity extending from the upper side of the force sensor to the opposite lower side of the force sensor,
   wherein the force sensor is located in the space between said first wall and said second wall,
   wherein said force sensor extends partially beyond an edge of the second wall;
   a force transmission for transmitting a force resulting from the load being carried by the first wall to the force sensor,
   wherein the force transmission comprises a force transmission body which extends between the upper side of the force sensor, through said cavity, and to the opposite lower side of the force sensor,
   the force transmission body being attached at least close to the opposite lower side of the force sensor and being at least partially bendable,
   wherein said force transmission body is an elongated pin having an oblong bendable middle portion of reduced cross section, said oblong middle portion having a length and a width, said length being larger than said width, and extending inside said cavity, wherein an accommodation of said oblong bendable middle portion of said elongated pin inside said cavity allows a bending of said elongated pin of the force transmission body over said oblong bendable middle portion inside said cavity due to the force resulting from the load being carried by the first wall; and a detachable attaching means that couples the force transmission body to the force sensor close to the second wall.

2. The device as claimed in claim 1, wherein the force sensor comprises a load cell provided with a pressure or strain-sensitive sensor.

3. The device as claimed in claim 1, wherein the oblong bendable middle portion of said elongate pin has a periphery smaller than a cross-section of said cavity.

4. The device as claimed in claim 1, wherein the force transmission body comprises an external screw thread for a screw connection to a complementary internal screw thread inside said cavity of the force sensor.

5. The device as claimed in claim 1, wherein the force transmission body comprises a laterally extending edge between an outer surface of the force sensor and the first wall.

6. The device as claimed in claim 1, wherein the force transmission body is fixed with a first outer end directly to the first wall.

7. The device as claimed in claim 1, wherein the force transmission body extends wholly through the force sensor from the first wall and is connected at least close to the second wall to the force sensor.

8. The device as claimed in claim 1, wherein the force transmission body has an upper end with a laterally protruding edge located above an upper surface of the upper side of the force sensor at said cavity such that i) when the first wall is not receiving the load, a lower surface of the laterally protruding edge is spaced apart from the upper surface of the upper side of the force sensor at said cavity, and ii) when the load is received on the first wall, a lower surface of the first wall bears on an upper surface of the upper end of the force transmission body and the lower surface of the laterally protruding edge bears on the upper surface of the upper side of the force sensor at said cavity.

9. The device as claimed in claim 1, wherein the attachment means is a fastening nut that fastens the force transmission body to the force sensor.

10. The device as claimed in claim 1, wherein,
said cavity has a length and a width, the length of said cavity being larger than the width of said cavity, the length of said cavity extending from the upper side of the force sensor to the opposite lower side of the force sensor, and
the length of said oblong middle portion is larger than the width of said cavity.

11. A lifting vehicle comprising the device as claimed in claim 1.

12. The lifting vehicle as claimed in claim 11, wherein the device comprises at least one lift fork in which the force sensor with the force transmission body is provided on both outer ends.

13. A device comprising:
a carrying body comprising a first wall, a lower opposite second wall, and a space located between the first wall and the opposite second wall;
a force sensor having an upper side, an opposite lower side, and a cavity that extends through the at least one force sensor from the upper side to the opposite lower side,
the force sensor being attached to the opposite second wall and located in the space with a part of the force sensor extending beyond an edge of the opposite second wall, the part of the force sensor that extends beyond an edge of the opposite second wall including the cavity and being free to bend in response to a force resulting from a load being received on an upper surface of the first wall;
a force transmission body for transmitting the force resulting from the load being received on the first wall to the force sensor, the force transmission body extending through the cavity of the force sensor from the upper side to the opposite lower side,
the force transmission body having an upper end with a laterally protruding edge located above an upper surface of the upper side of the force sensor at the cavity such that i) when the first wall is not receiving the load, a lower surface of the laterally protruding edge is spaced apart from the upper surface of the upper side of the force sensor at the cavity, and ii) when the load is received on the first wall, a lower surface of the first wall bears on an upper surface of the upper end of the force transmission body and the lower surface of the laterally protruding edge bears on the upper surface of the upper side of the force sensor at the cavity; and
an attachment element that engages a lower end of the force transmission body to couple the force transmission body to the opposite lower side of the force sensor,
wherein the force transmission body includes a flexible portion of locally reduced cross-section located between the upper side and the opposite lower side of the force sensor that bends under the force resulting from the load being received on the first wall.

14. The device as claimed in claim 13, wherein the attachment element is a fastening nut with an upper surface that bears against a lower surface of the lower side of the force sensor.

15. The device as claimed in claim 14, wherein the flexible portion has a periphery smaller than a cross-section of the cavity.

16. The device as claimed in claim 15, wherein the force transmission body is fixed directly to the first wall.

17. The device as claimed in claim 14, wherein the force transmission body is fixed directly to the first wall.

18. The device as claimed in claim 13, wherein the flexible portion has a periphery smaller than a cross-section of the cavity.

19. The device as claimed in claim 13, wherein the force transmission body is fixed directly to the first wall.

20. A device comprising:
a carrying body for carrying a load, the carrying body comprising a first wall which receives the load, a second wall opposite to the first wall, and a space located between the first wall and the second wall;
a force sensor having an upper side, an opposite lower side, and a cavity, said cavity extending from the upper side to the opposite lower side,
wherein the force sensor is located in the space between said first wall and said second wall and extends partially beyond an edge of the second wall;
a force transmission for transmitting a force resulting from the load being carried by the first wall to the force sensor,
wherein the force transmission comprises a force transmission body which extends between the upper side of the force sensor, through said cavity, and to the opposite lower side of the force sensor, the force transmission body being an at least partially bendable, elongated pin having an oblong bendable middle portion of reduced cross section that extends inside said cavity, wherein an accommodation of said oblong bendable middle portion of said elongated pin inside said cavity allows a bending of the elongated pin of the force transmission body over said oblong bendable middle portion inside said cavity due to the force resulting from the load being carried by the first wall, wherein the force transmission body is detachable coupled to the force sensor close to the second wall, and wherein the force transmission body has an upper end with a laterally protruding edge located above an upper surface of the upper side of the force sensor at said cavity such that i) when the first wall is not receiving the load, a lower surface of the laterally protruding edge is spaced apart from the upper surface of the upper side of the force sensor at said cavity, and ii) when the load is received on the first wall, a lower surface of the first wall bears on an upper surface of the upper end of the force transmission body and the lower surface of the laterally protruding edge bears on the upper surface of the upper side of the force sensor at said cavity.

* * * * *